United States Patent [10] Patent No.: US 12,230,948 B2
Geens et al. (45) Date of Patent: Feb. 18, 2025

(54) CABLE SEALING UNIT WITH MULTIPLE CONFIGURATIONS

(71) Applicant: COMMSCOPE CONNECTIVITY BELGIUM BVBA, Kessel-Lo (BE)

(72) Inventors: Johan Geens, Bunsbeek (BE); Kristof Vastmans, Kessel-Lo (BE); Pieter Vermeulen, Westerlo (BE)

(73) Assignee: CommScope Connectivity Belgium BVBA, Kessel-Lo (BE)

(*) Notice: Subject to any disclaimer, the term of this patent is extended or adjusted under 35 U.S.C. 154(b) by 223 days.

(21) Appl. No.: 17/795,835

(22) PCT Filed: Jan. 29, 2021

(86) PCT No.: PCT/EP2021/052200
§ 371 (c)(1),
(2) Date: Jul. 27, 2022

(87) PCT Pub. No.: WO2021/152145
PCT Pub. Date: Aug. 5, 2021

(65) Prior Publication Data
US 2023/0072684 A1 Mar. 9, 2023

Related U.S. Application Data

(60) Provisional application No. 62/968,646, filed on Jan. 31, 2020, provisional application No. 63/012,667, filed on Apr. 20, 2020.

(51) Int. Cl.
*H02G 15/013* (2006.01)
*G02B 6/44* (2006.01)
(52) U.S. Cl.
CPC ......... *H02G 15/013* (2013.01); *G02B 6/4444* (2013.01)

(58) Field of Classification Search
None
See application file for complete search history.

(56) References Cited

U.S. PATENT DOCUMENTS 5,224,199 A * 6/1993 Cortijo ................. G02B 6/444
385/135
5,235,134 A * 8/1993 Jaycox ................ H02G 15/076
156/49

(Continued)

FOREIGN PATENT DOCUMENTS

EP 159857 A * 10/1985 ............. E02D 17/18
EP 0 442 941 B1 1/1995

(Continued)

OTHER PUBLICATIONS

International Search Report and Written Opinion of the International Searching Authority for International Patent Application No. PCT/EP2021/052200 mailed Apr. 28, 2021, 14 pages.

(Continued)

*Primary Examiner* — Binh B Tran
*Assistant Examiner* — Muhammed Azam
(74) *Attorney, Agent, or Firm* — Merchant & Gould P.C.

(57) ABSTRACT

A communication enclosure includes a housing and a fiber optic organizer. The housing defines a plurality of ports. The fiber optic organizer includes a tower configured to hold one or more fiber management trays. The tower is mountable to the housing in one of at least two different tower positions. In the first tower position, the tower is disposed between a first of the ports and a second of the ports. In the second tower position, the tower is disposed between the second port and a third of the ports.

24 Claims, 10 Drawing Sheets

(56) References Cited

U.S. PATENT DOCUMENTS

| | | | | |
|---|---|---|---|---|
| 5,323,480 | A * | 6/1994 | Mullaney | G02B 6/4455 385/134 |
| 5,655,044 | A * | 8/1997 | Finzel | G02B 6/4455 385/135 |
| 5,740,298 | A * | 4/1998 | Macken | G02B 6/4454 385/135 |
| 6,046,406 | A | 4/2000 | Milanowski et al. | |
| 6,507,691 | B1 * | 1/2003 | Hunsinger | G02B 6/4454 385/136 |
| 6,721,483 | B2 * | 4/2004 | Grubish | G02B 6/4444 385/139 |
| 6,856,747 | B2 * | 2/2005 | Cloud | H02G 3/22 385/135 |
| 7,239,789 | B2 * | 7/2007 | Grubish | G02B 6/4442 385/135 |
| 7,625,252 | B2 * | 12/2009 | Flynn | H01R 4/36 439/798 |
| 7,676,136 | B2 * | 3/2010 | Wakileh | G02B 6/44528 385/134 |
| 7,689,090 | B2 * | 3/2010 | Kluwe | H02G 15/013 385/134 |
| 7,702,208 | B2 * | 4/2010 | Mudd | G02B 6/4442 385/53 |
| 7,780,173 | B2 * | 8/2010 | Mullaney | G02B 6/4442 277/621 |
| 8,050,528 | B2 * | 11/2011 | Shimirak | H02G 15/013 174/77 R |
| 8,055,114 | B2 * | 11/2011 | Kluwe | H02G 15/076 385/139 |
| 8,207,445 | B2 * | 6/2012 | Knorr | G02B 6/4444 174/93 |
| 8,604,360 | B2 * | 12/2013 | Knorr | H02G 15/013 277/603 |
| 8,686,289 | B2 * | 4/2014 | Burke | G02B 6/44775 174/650 |
| 8,687,934 | B2 * | 4/2014 | Wright | G02B 6/46 385/135 |
| 8,774,586 | B2 * | 7/2014 | Kim | G02B 6/4444 385/138 |
| 8,861,919 | B2 * | 10/2014 | Alston | G02B 6/3874 385/99 |
| 8,989,550 | B2 * | 3/2015 | Allen | G02B 6/4454 385/135 |
| 9,036,973 | B2 * | 5/2015 | Hsing | H01R 4/72 385/135 |
| 9,086,557 | B2 * | 7/2015 | Hsing | G02B 6/4454 |
| 9,106,981 | B2 * | 8/2015 | Vastmans | G02B 6/4477 |
| 9,229,186 | B2 * | 1/2016 | Allen | G02B 6/4444 |
| 9,343,891 | B2 * | 5/2016 | Vanhentenrijk | H02G 15/013 |
| 9,368,952 | B2 * | 6/2016 | Vanhentenrijk | H02G 15/013 |
| 9,394,442 | B2 * | 7/2016 | Adams | C08F 287/00 |
| 9,395,506 | B2 * | 7/2016 | Simmons | H02G 15/117 |
| 9,502,878 | B2 * | 11/2016 | Coenegracht | G02B 6/4444 |
| 9,513,451 | B2 * | 12/2016 | Corbille | G02B 6/4494 |
| 9,575,279 | B1 * | 2/2017 | Yoshizawa | G02B 6/483 |
| 9,647,437 | B2 * | 5/2017 | Aznag | H02G 15/076 |
| 9,753,237 | B2 * | 9/2017 | Coenegracht | H02G 3/088 |
| 9,791,653 | B2 * | 10/2017 | Aznag | G02B 6/4452 |
| 9,948,082 | B2 | 4/2018 | Coenegracht et al. | |
| 9,983,377 | B2 * | 5/2018 | Dellinger | G02B 6/4471 |
| 10,288,820 | B2 * | 5/2019 | Coenegracht | G02B 6/3825 |
| 10,288,829 | B2 * | 5/2019 | Claessens | G02B 6/44765 |
| 10,298,003 | B2 * | 5/2019 | Vanhentenrijk | G02B 6/4444 |
| 10,371,912 | B2 * | 8/2019 | Coenegracht | H02G 15/013 |
| 10,578,823 | B2 * | 3/2020 | Raven | G02B 6/44528 |
| 10,707,663 | B2 * | 7/2020 | Kempeneers | H02G 15/013 |
| 11,016,257 | B2 * | 5/2021 | Aznag | G02B 6/4452 |
| 11,275,226 | B2 * | 3/2022 | Claessens | G02B 6/4455 |
| 11,360,282 | B2 * | 6/2022 | Coenegracht | G02B 6/4452 |
| 2002/0064363 | A1 * | 5/2002 | Grubish | G02B 6/4444 385/135 |
| 2004/0156611 | A1 * | 8/2004 | Cloud | G02B 6/4444 385/135 |
| 2005/0271344 | A1 * | 12/2005 | Grubish | G02B 6/445 385/135 |
| 2007/0183732 | A1 * | 8/2007 | Wittmeier | G02B 6/44528 385/135 |
| 2009/0103877 | A1 * | 4/2009 | Kluwe | H02G 15/076 385/134 |
| 2009/0185782 | A1 * | 7/2009 | Parikh | G02B 6/4442 385/135 |
| 2009/0252472 | A1 * | 10/2009 | Solheid | G02B 6/4454 385/135 |
| 2009/0304341 | A1 * | 12/2009 | Shimirak | H02G 15/013 277/603 |
| 2010/0150517 | A1 * | 6/2010 | Allen | G02B 6/4444 385/135 |
| 2010/0183274 | A1 * | 7/2010 | Brunet | G02B 6/4455 385/135 |
| 2012/0235363 | A1 * | 9/2012 | Vanhentwnrijk | H02G 15/013 277/627 |
| 2013/0236151 | A1 * | 9/2013 | Kim | G02B 6/4444 385/135 |
| 2013/0294739 | A1 * | 11/2013 | Allen | G02B 6/4454 385/135 |
| 2014/0321825 | A1 * | 10/2014 | Claessens | G02B 6/444 385/135 |
| 2015/0137461 | A1 | 5/2015 | Coenegracht et al. | |
| 2015/0168663 | A1 * | 6/2015 | Aznag | G02B 6/4452 385/135 |
| 2015/0168664 | A1 * | 6/2015 | Coenegracht | G02B 6/4446 385/135 |
| 2016/0320580 | A1 * | 11/2016 | Cornelisson | G02B 6/4444 |
| 2018/0284378 | A1 | 10/2018 | Claessens et al. | |
| 2019/0170961 | A1 | 6/2019 | Coenegracht et al. | |
| 2020/0150370 | A1 * | 5/2020 | Van Baelen | G02B 6/3897 |
| 2022/0337044 | A1 * | 10/2022 | Vastmans | G02B 6/44775 |
| 2023/0194815 | A1 * | 6/2023 | Geens | G02B 6/4444 385/135 |
| 2023/0314728 | A1 * | 10/2023 | Claessens | G02B 6/4444 385/135 |

FOREIGN PATENT DOCUMENTS

| | | | | |
|---|---|---|---|---|
| EP | 0 587 616 B1 | 7/1996 | | |
| WO | 2018/202812 A2 | 11/2018 | | |
| WO | WO-2021152145 A1 * | 8/2021 | | G02B 6/4442 |
| WO | WO-2021216594 A1 * | 10/2021 | | G02B 6/4444 |

OTHER PUBLICATIONS

Specification Control Drawings TTRC Wall Closure System, SCD 296, Tyco Electronics Raychem, 1-9 (Jan. 2000).

* cited by examiner

CABLE SEALING UNIT WITH MULTIPLE CONFIGURATIONS

CROSS-REFERENCE TO RELATED APPLICATIONS

This application is a National Stage Application of PCT/EP2021/052200, filed on Jan. 29, 2020, which claims the benefit of U.S. Patent Application Ser. No. 62/968,646, filed on Jan. 31, 2020, and claims the benefit of U.S. Patent Application Ser. No. 63/012,667, filed on Apr. 20, 2020, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

Some aspects of the disclosure are directed to a communication enclosure including a housing and a fiber optic organizer. The housing defines a plurality of gel block ports each adapted to receive a cable sealing gel block. The fiber optic organizer includes a tower configured to hold one or more fiber management trays. The tower is mountable to the housing in one of at least two different tower positions. In the first tower position, the tower is disposed between a first of the gel block ports and a second of the gel block ports. In the second tower position, the tower is disposed between the second gel block port and a third of the gel block ports.

In certain implementations, at least two of the gel block ports have different transverse cross-sectional areas. For example, the transverse cross-sectional area of one gel block port may be at least 25 percent larger than the transverse cross-sectional area of another gel block port. In another example, the transverse cross-sectional area of one gel block port is at least 50 percent larger than the transverse cross-sectional area of another gel block port. In certain examples, the gel block ports each have round transverse cross-sections.

In certain implementations, the housing includes a base that defines the gel block ports. The tower mounts to the base in each of the two different positions. In certain examples, the housing also includes a dome having an open end positioned opposite a closed end. The base mounts to the dome at the open end of the dome. In an example, the base sealingly mounts to the dome to define a sealed interior of the housing. In certain examples, the dome and the base have transverse cross-sectional shapes that are generally rectangular. In an example, the transverse cross-sectional shapes of the dome and the base are square. In an example, the base is a unitary molded piece.

In certain implementations, the tower includes first and second fiber routing paths for routing fibers from an attachment end of the tower toward the trays. The tower includes a divider for separating the first and second fiber routing paths. In certain examples, the divider includes a first divider portion on an upright portion of the tower and a second divider portion on a lateral extension portion of the tower. In an example, the upright portion of the tower is positioned adjacent to a periphery of the base when mounted to the base in the first and second tower positions.

In certain examples, the first tower position is disposed between two gel block ports having a common transverse cross-sectional area and the second tower position is disposed between two gel block ports having different transverse cross-sectional areas.

In certain examples, the first and second tower positions are offset ninety degrees with respect to one another about a central longitudinal axis of the housing.

In certain implementations, the base defines first, second, and third gel block ports consecutively positioned about a center axis of the housing in a clockwise or counter-clockwise pattern.

In certain examples, the first routing path is positioned adjacent to the first gel block port and the second fiber routing path is positioned adjacent to the second gel block port when the tower is mounted to the base in the first tower position. The first routing path is positioned adjacent to the second gel block port and the second fiber routing path is positioned adjacent to the third gel block port when the tower is mounted to the base in the second tower position.

In certain examples, the divider is oriented between the first and second gel block ports when the tower is mounted to the base in the first tower mounting position and the divider is oriented between the first and third gel block ports when the tower is mounted to the base in the second tower mounting position.

In certain implementations, the base defines first, second, third and fourth quadrants bounded by first and second perpendicular reference planes that intersect at a central longitudinal axis of the housing. The first, second, third, and fourth quadrants are sequentially positioned in a clockwise or counterclockwise direction about the central longitudinal axis of the housing. The first gel block port is located at least primary in the first quadrant; the second gel block port is located at least primarily in the second quadrant; and the third gel block port is located at least primarily in the third quadrant. In certain examples, the fourth quadrant is primarily void of gel block ports.

Other aspects of the disclosure are directed to a communication enclosure including a housing and a fiber optic organizer. The housing defines a plurality of ports though which cables or components of cables (e.g., optical fibers, electrical conductors, etc.). The fiber optic organizer includes a tower configured to hold one or more fiber management trays. The tower is mountable to the housing in one of at least two different tower positions. In the first tower position, the tower is disposed between a first of the ports and a second of the ports. In the second tower position, the tower is disposed between the second port and a third of the ports.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
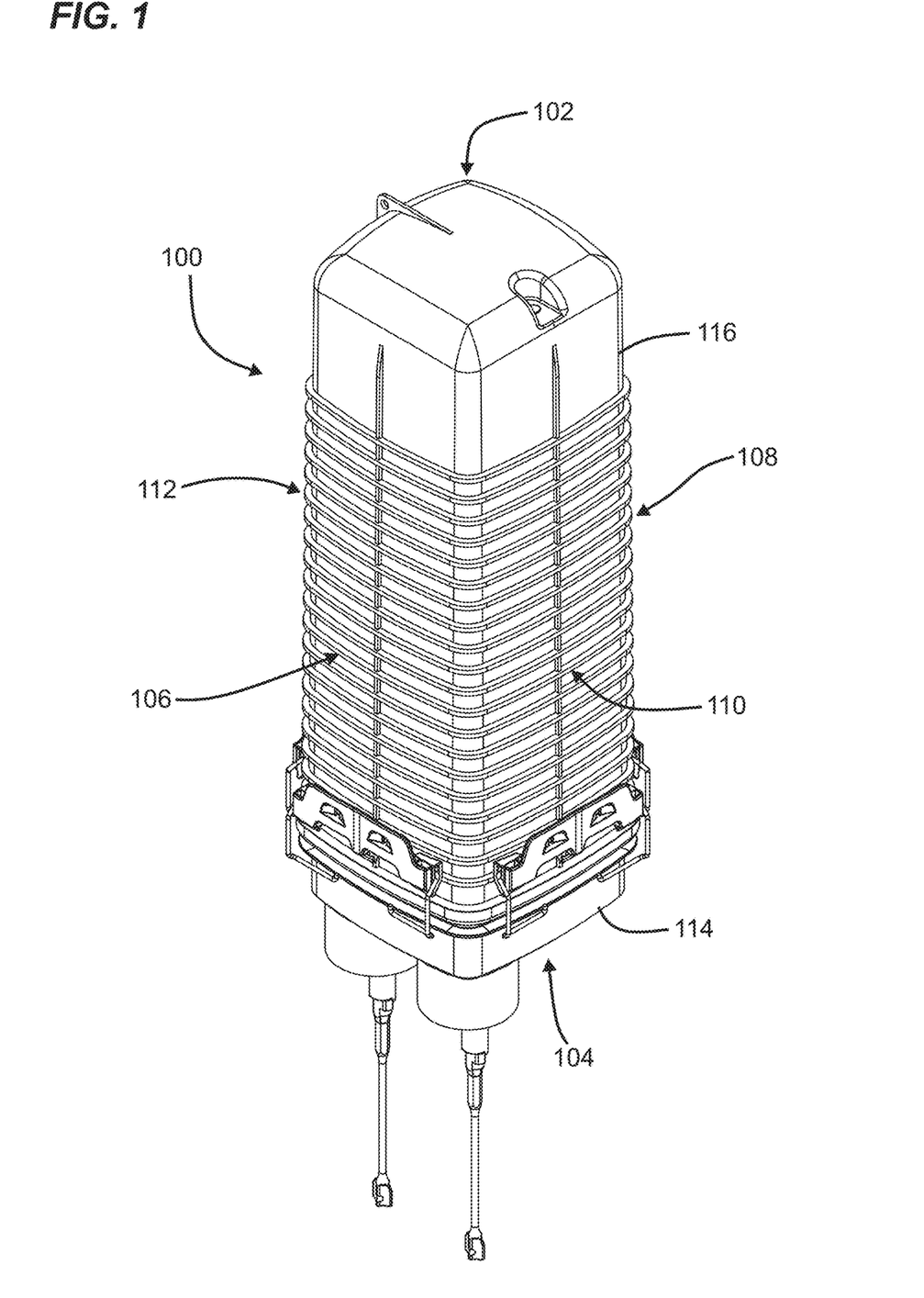
FIG. 1 is a top, perspective view of an example communications enclosure including a dome mounted to a base that holds plurality of cable sealing gel blocks to seal cables entering the enclosure, the communications enclosure being configured in accordance with the principles of the present disclosure.
Figure 2:
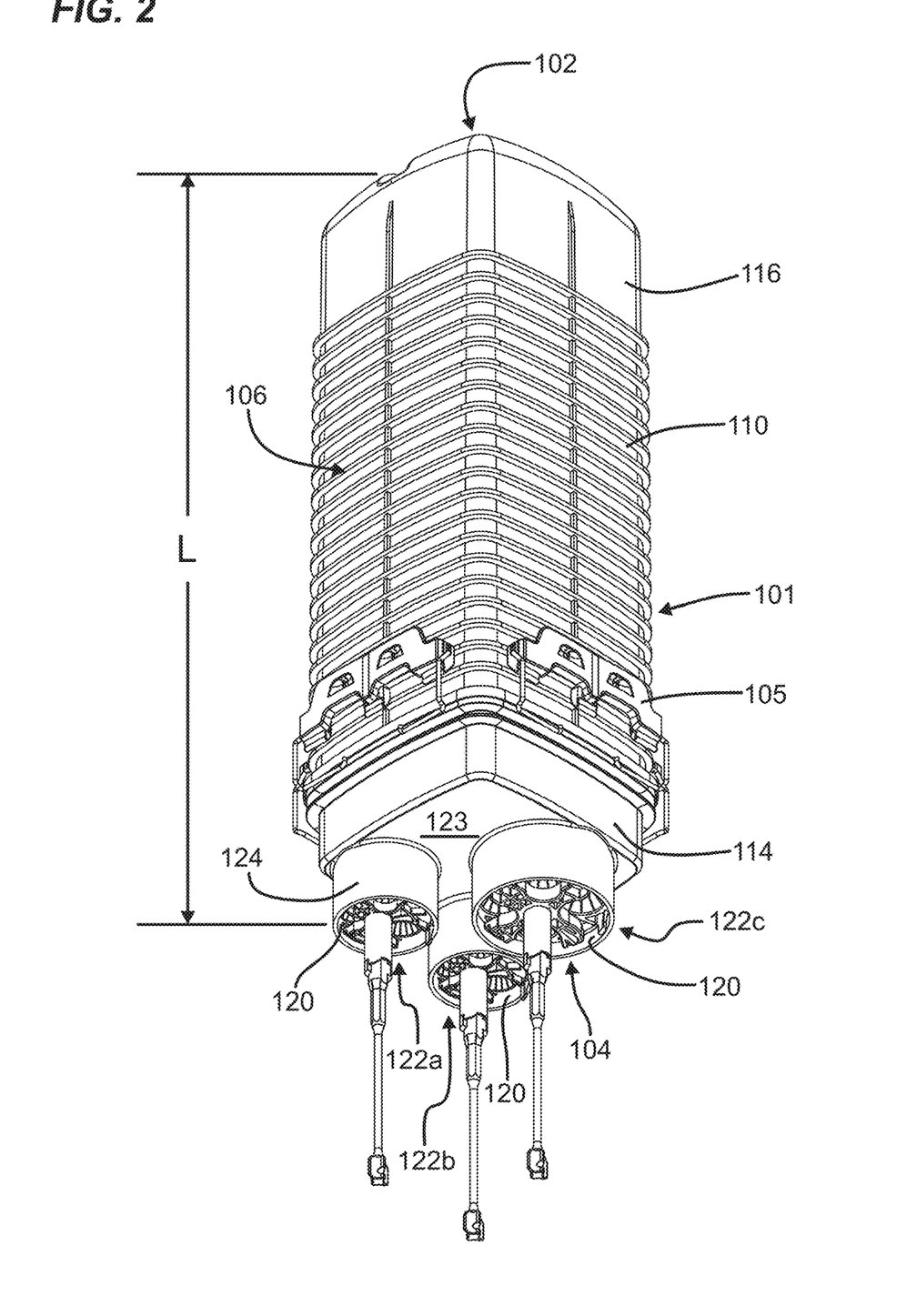
FIG. 2 is a bottom perspective view of the communications enclosure of FIG. 1.
Figure 3:
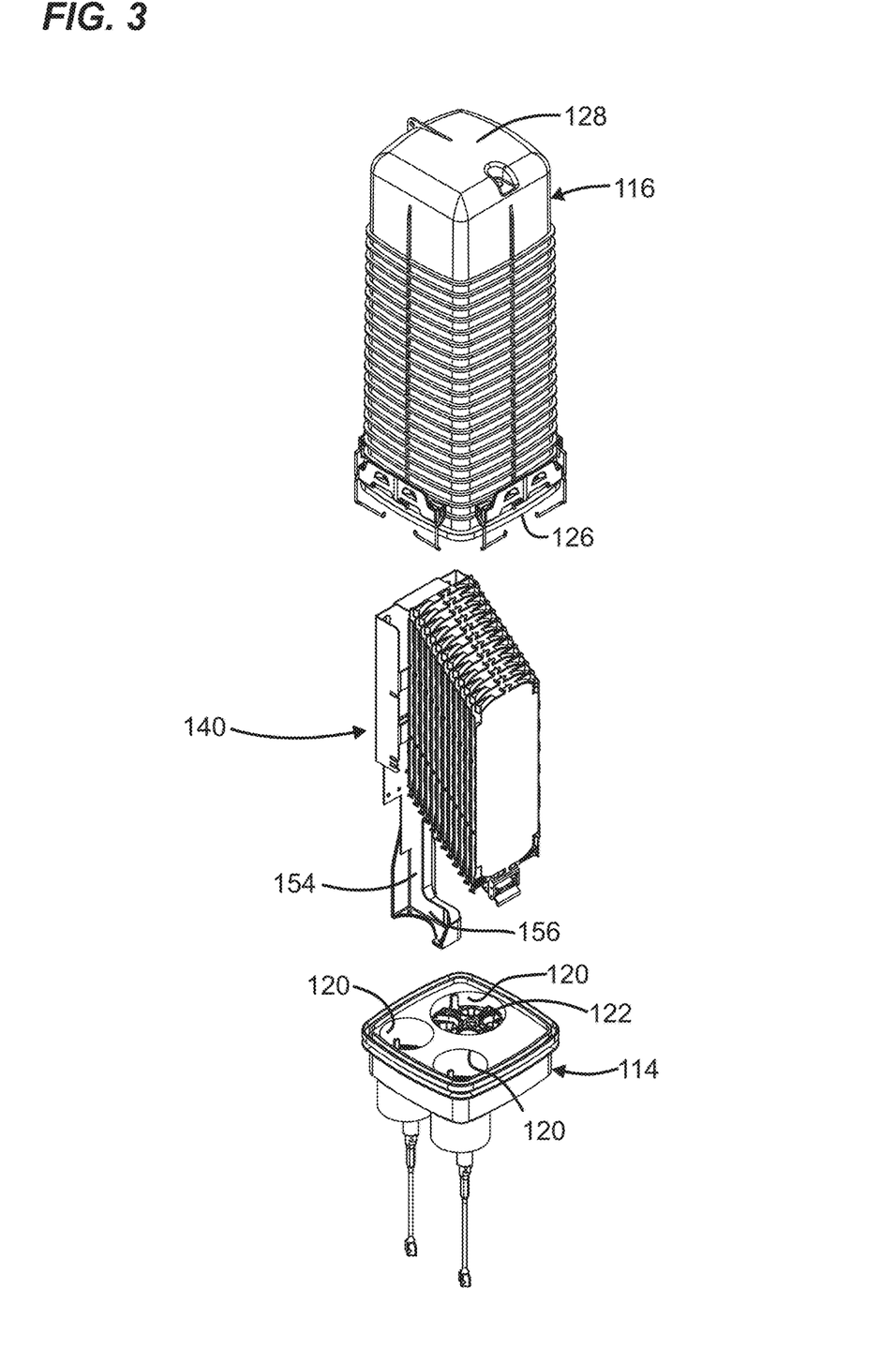
FIG. 3 is an exploded view of the communications enclosure of FIG. 1 so that a fiber optic organizer of the enclosure is visible.

The present disclosure is directed to a communications enclosure 100 (e.g., a telecommunications enclosure) extending along a length L from a first end 102 to a second end 104 (FIG. 2). The enclosure 100 includes a housing 101 that defines a sealed interior. A fiber optic organizer 140 (FIG. 3) is disposed within the sealed interior. The first end 102 of the enclosure 100 is closed and the second end 104 of the enclosure 100 defines gel block ports 120 at each of which a cable sealing gel block 122 can be received. Cables pass through the cable sealing gel blocks 122 to enter the housing 101 and reach the fiber optic organizer 140. In certain implementations, the fiber optic organizer 140 can be selectively mounted in one of multiple tower positions relative to the housing 101.

In accordance with some aspects of the disclosure, the fiber optic organizer 140 is mountable to the housing in one of at least two different tower positions. In the first tower position, the tower is disposed between a first of the gel block ports and a second of the gel block ports. In the second tower position, the tower is disposed between the second gel block port and a third of the gel block ports that is different from the first gel block port. In certain examples, the fiber optic organizer 140 faces in different directions between the first and second tower positions.

In certain implementations, the housing 101 includes a dome 116 and a base 114. The dome 116 defines the first end 102 of the enclosure 100 and the base 114 defines the second end 104 of the enclosure. Accordingly, the base 114 defines the gel block ports 120. The dome 116 cooperates with the base 114 to define the sealed interior of the housing 101. In certain examples, a gasket is disposed between the base 114 and the dome 116 at a mating interface thereof. The gasket provides environmental sealing at the mating interface.

In certain examples, the dome 116 has an open end 126 positioned opposite from a closed end 128. The base 114 mounts at the open end 126 of the dome 116 to close the open end 126 of the dome 116. In some examples, the dome 116 and the base 114 are secured together by latches 105. In other examples, however, the dome 116 and base 114 are secured together by fasteners, a friction-fit, or securement techniques.

Figure 4:
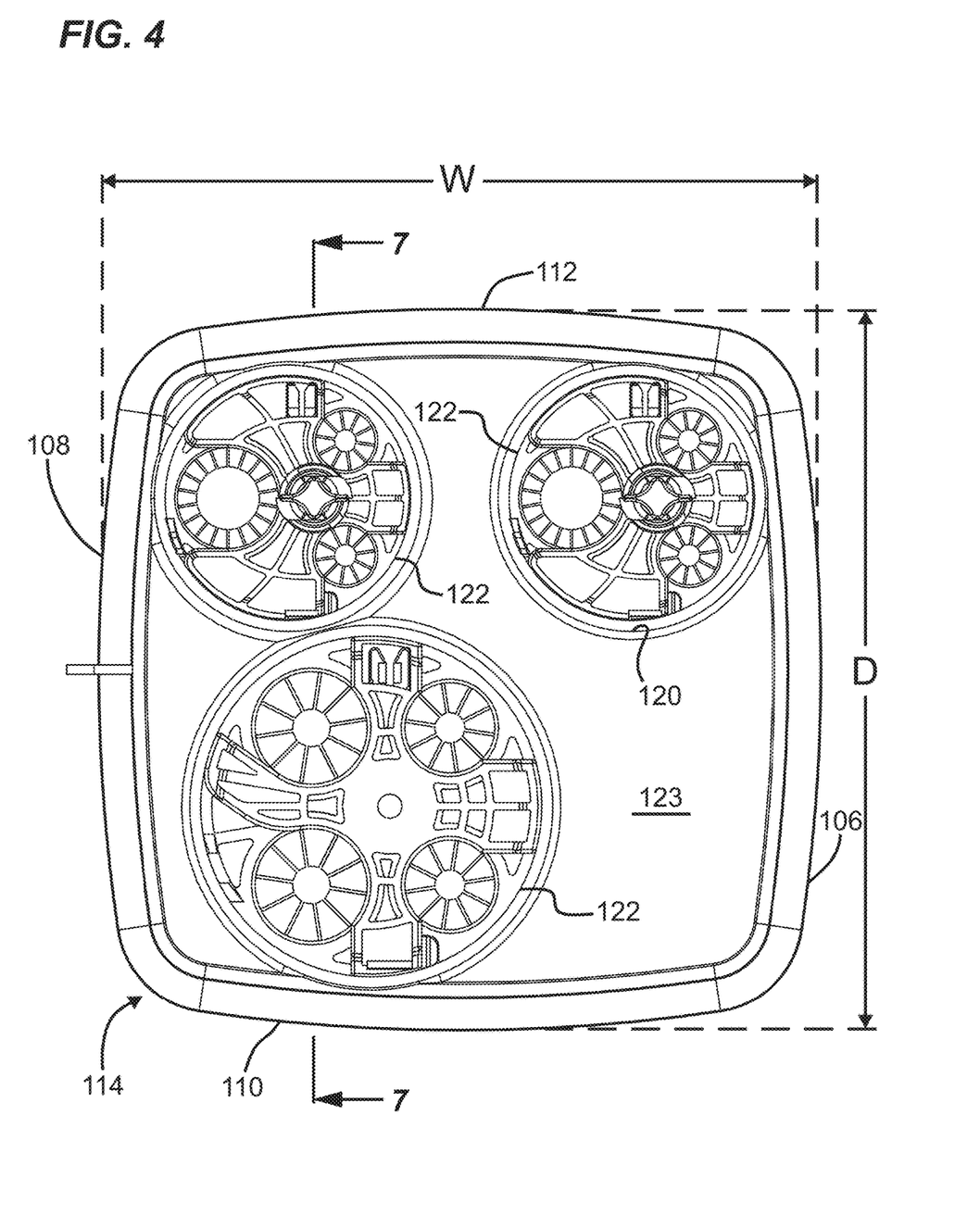
FIG. 4 is a bottom plan view of the base of the communications enclosure of FIG. 1 where the cable sealing gel blocks are visible within the gel block ports.

In some examples, the dome 116 and the base 114 have transverse cross-sectional shapes that are polygonal. In certain examples, the dome 116 and the base 114 have transverse cross-sectional shapes that are generally rectangular. In certain examples, the housing 101 has a width W extending from a first side 106 to a second side 108 (FIG. 4) and a depth D extending from a third side 110 to a fourth side 112 (FIG. 4). In certain examples, the transverse cross-sectional shapes of the dome 116 and the base 114 are generally square. In such examples, the width W is generally the same as the depth D. In other examples, the dome 116 and the base 114 have transverse cross-sectional shapes that are generally rounded (e.g., circular, oblong, etc.).

In certain implementations, the base 114 is a unitary (e.g., molded) piece. the base 114 includes a plate portion 123 through which the gel block ports 120 extend. In some implementations, sleeves 124 extend outwardly from the plate portion 123 to extend the lengths of the gel block ports 120. For example, the plate portion 123 extends across the open end 126 of the dome 116 and the sleeves 124 extend outwardly from the plate portion 123 away from the dome 116. In certain examples, the sleeves 124 may define a lip on which the corresponding cable sealing gel block 122 seats when installed at the gel block port 120. In other examples, the cable sealing gel block 122 can be otherwise secured at the gel block port 120 (e.g., using fasteners, friction-fit, or other attachment mechanisms). In other examples, the sleeves 124 can detachably couple to the plate portion 123 and seals can be provided for sealing between the sleeves 124 and the plate portion 123.

Figure 5:
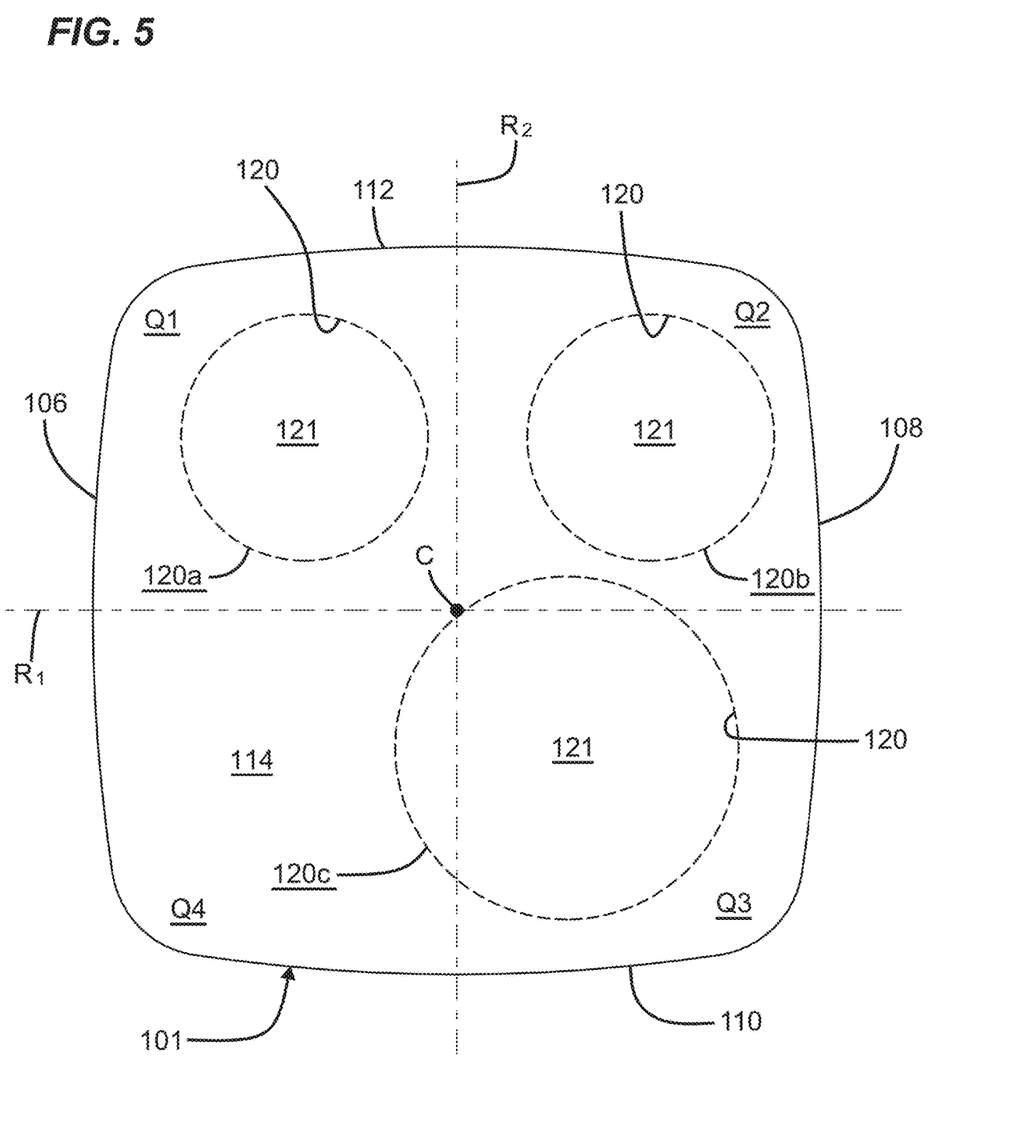
FIG. 5 is a schematic diagram of the base taken from a top plan view of the base, where the base is divided into quadrants using first and second reference planes, and wherein the gel block ports are covered by covering portions (e.g., punch-out covers)

In certain implementations, cover portions 121 are initially disposed at the gel block ports 120 to close the gel block ports 120 (e.g., see FIG. 5). The cover portions 121 inhibit cable sealing gel blocks 122 from being positioned within the gel block ports 120. In certain examples, the cover portions 121 inhibit dust or other particle contaminants from entering the housing 101 through the gel block ports 120. In certain examples, the cover portions 121 inhibit water or other liquids from entering the housing 101 through the gel block ports 120. Each of the cover portions 121 is individually removable from the respective gel block port 120 to enable installation of a cable sealing gel block 122 at the gel block port 120. In certain examples, the base 114 is a molded piece and the cover portions 121 are unitary with the molded piece. In certain examples, peripheries of the cover portions 121 may be perforated, scored, or otherwise seamed to facilitate removal of the cover portions 121. In some examples, the cover portions 121 are punch out covers. In other examples, the cover portions 121 are removed by cutting.

In certain implementations, at least one of the gel block ports 120 has a different transverse cross-sectional area than another of the gel block ports 120 (e.g., see FIG. 4). In certain implementations, at least two of the gel block ports 120 have a common transverse cross-sectional area (e.g., see FIG. 4). In certain implementations, the base 114 includes first, second, and third gel block ports 120a, 120b, 120c each adapted to receive a respective cable-sealing gel block 122.

In certain implementations, each of the first, second, and third gel block ports 120a-120c have a common transverse cross-sectional shape. In certain examples, the first, second and third gel block ports 120a-120c each have a circular transverse cross-sectional shape. In certain examples, the first, second and third gel block ports 120a-120c each have an oval transverse cross-sectional shape. In certain examples, the first, second and third gel block ports 120a-120c each have an otherwise oblong transverse cross-sectional shape.

In certain examples, the base 114 can be divided into first, second, third and fourth quadrants Q1-Q4 by first and second perpendicular reference planes R1, R2 that intersect at a central longitudinal axis C of the housing 101 (e.g., see FIG. 5). In the example shown, the first, second, third and fourth quadrants Q1-Q4 are sequentially positioned in a clockwise direction about the central longitudinal axis C of the housing 101. The first, second, and third gel block ports 120a, 120b, 120c also are positioned sequentially about the central longitudinal axis C of the housing 101 in a clockwise direction (e.g., see FIG. 5). Of course, the quadrants Q1-Q4 and gel block ports 120a-120c can be sequentially positioned in a counter-clockwise direction about the axis C.

In certain examples, the first and second gel block ports 120a, 120b have the same transverse cross-sectional area while the third gel block port 120c has a different transverse cross-sectional area from the second gel block port 120b. In certain examples, the transverse cross-sectional area of the third gel block port 120c is at least 25 percent larger than the transverse cross-sectional area of the second gel block port 120b. In certain examples, the transverse cross-sectional area of the third gel block port 120c is at least 50 percent larger than the transverse cross-sectional area of the second gel block port 120b.

In certain examples, the first gel block port 120a is located at least primary in the first quadrant Q1, the second gel block port 120b is located at least primarily in the second quadrant Q2, and the third gel block port 120c is located at least primarily in the third quadrant Q3. As the term is used herein, a gel block port 120 is primarily located in a quadrant if at least a majority of the transverse cross-sectional area of the gel block port 120 is contained within the boundaries of the quadrant. In the example shown, the first gel block port 120a is fully disposed within the first quadrant Q1 and the second gel block 120b is fully disposed within the second quadrant Q2. The third gel block port 120c, however, is primarily disposed in the third quadrant Q3 while having portions extending into the second and fourth quadrants Q2, Q4 in FIG. 5. In certain examples, the fourth quadrant Q4 is primarily void of gel block ports 120. As the term is used herein, a quadrant is primary void of gel block ports 120 is no gel block port 120 has at least a majority of its transverse cross-sectional area disposed within the boundaries of the quadrant.

Figure 6:
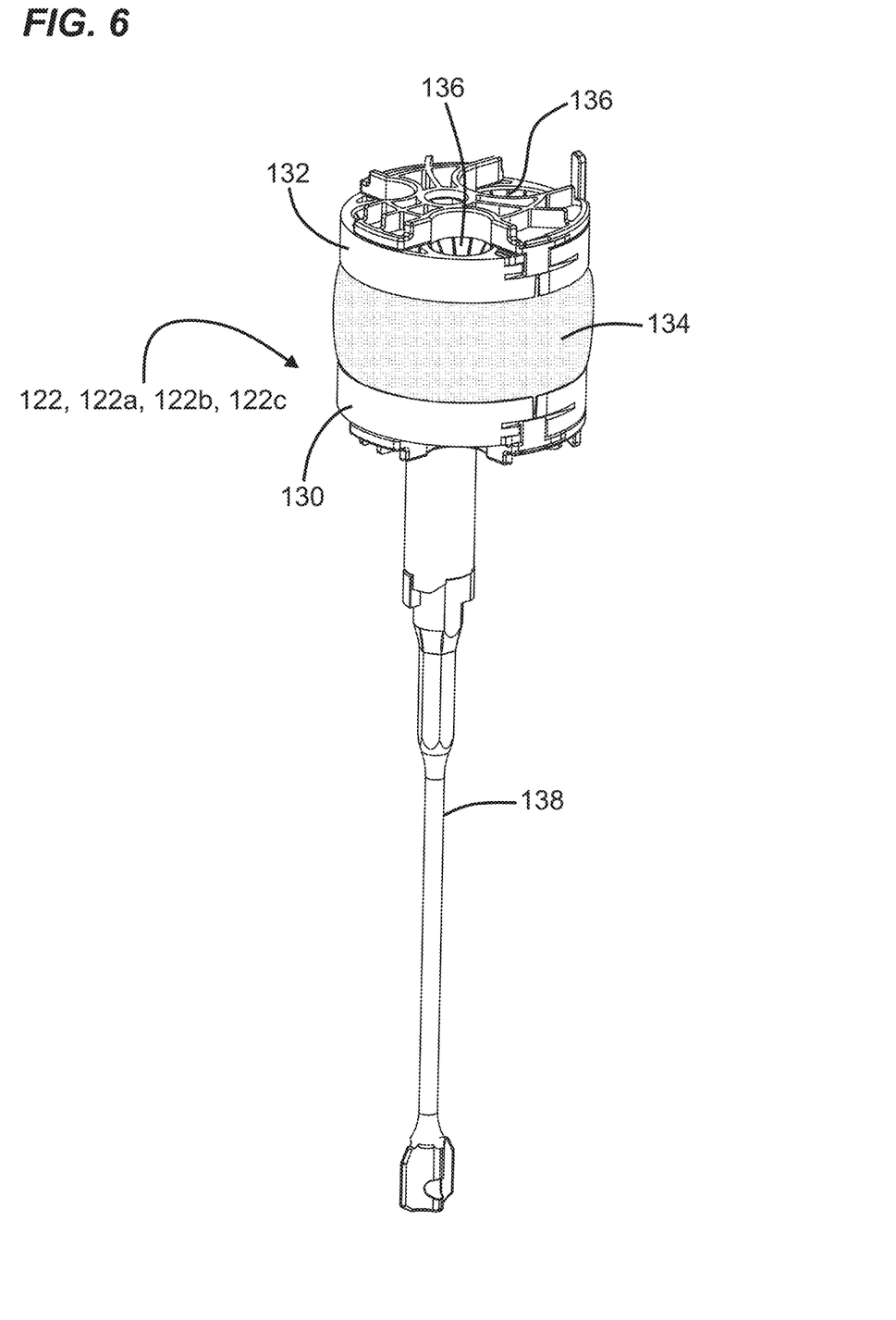
FIG. 6 is a perspective view of an example cable sealing gel block suitable for use with the enclosure of FIGS. 1-5.
Figure 7:
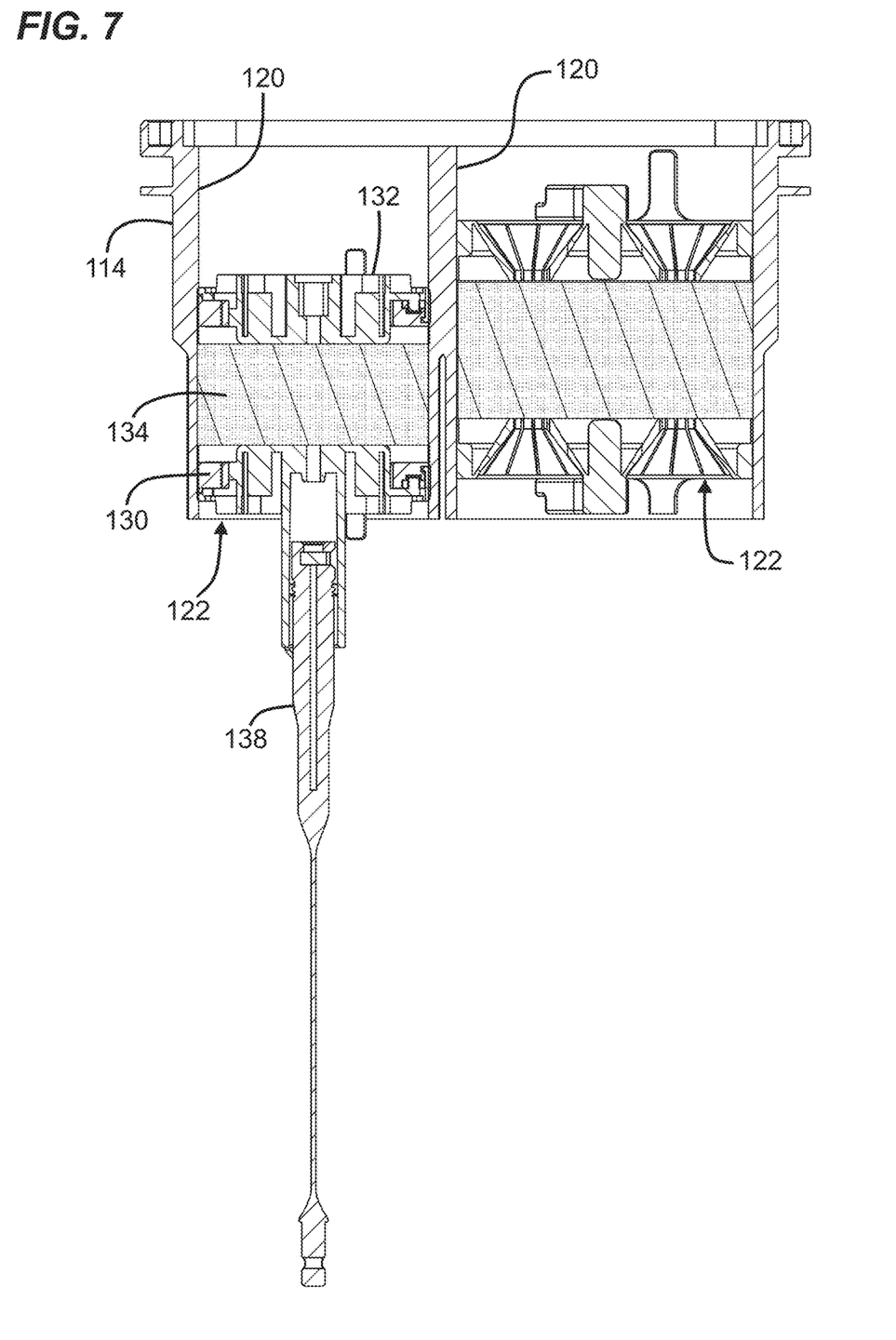
FIG. 7 is a longitudinal cross-section of the base with the cable sealing gel blocks installed therein, the cross-section being taken along the 7-7 axis of FIG. 4.

FIG. 6 illustrates an example cable sealing gel block 122 suitable for use with the enclosure 100 disclosed herein. The cable sealing gel block 122 includes a volume of gel 134 positioned axially between first and second gel pressurization structures 130, 132. Each of the gel pressurization structures 130, 132 defines one or more cable pass-through locations 136 that align with the one or more cable pass-through locations of the other pressurization structure 132, 130. An actuator 138 enables a user to move the pressurization structures 130, 132 towards each other to pressurize the volume of gel 134. In some examples, the actuator 138 includes a threaded compression mechanism. In other examples, the actuator 138 includes a camming compression mechanism. An example actuator suitable for use with the cable sealing gel block 122 is shown and described in U.S. Pat. No. 9,948,082, the disclosure of which is hereby incorporated herein by reference in its entirety.

When the cable sealing gel block 122 is installed in one of the gel block ports 120, pressurizing the volume of gel 134 of the cable sealing gel block 122 (e.g., using the actuator 138) provides sealing between a circumferential exterior of the volume of gel 134 and the portion of the base 114 defining the gel block port 120. The volume of gel 134 also conforms about and seals about cables routed through the cable sealing gel block 122 during pressurization. When the volume of gel 134 is depressurized (e.g., using the actuator 138), the circumferential exterior of the volume of gel 134 unseals from the portion of the base 114 defining the gel block port 120, thereby allowing movement (e.g., removal) of the cable sealing gel block 122 relative to the gel block port 120.

In certain implementations, the first gel block port 120a is configured to receive a first cable sealing gel block 122a; the second gel block port 120b is adapted to receive a second cable sealing gel block 122b, and the third gel block port 120c is adapted to receive a third cable sealing gel block 122c. The third cable sealing gel block 122c has a larger transverse cross-sectional area as compared to the first cable sealing gel block 122a. The third cable sealing gel block 122b is adapted to receive and seal larger diameter cables as compared to the first cable sealing gel block 122a.

Referring to FIGS. 3 and 8-10, a fiber optic organizer 140 mounts within the housing 101. In certain implementations, the fiber optic organizer 140 includes a tower 142 and one or more fiber management trays 144 that are supported by the tower 142. In certain examples, the fiber management trays 144 are pivotally moveable relative to the tower 142. In certain implementations, the tower 142 includes an upright portion 150 that extends from an attachment end 146 toward the trays 144. The upright portion 150 includes a support member 155 to which the management trays 144 mount (e.g., pivotally mount). In certain implementations, the tower 142 also includes a lateral extension portion 152 that projects laterally outwardly from the upright portion 150 at the attachment end 146 of the tower 142.

In certain examples, one or more of the fiber management trays 144 include splice trays for holding optical splices between optical fibers. In certain examples, one or more of the fiber management trays 144 are storage trays for holding excess fiber length. In certain examples, one or more of the fiber management trays 144 include optical splitter trays for holding optical power splitters, wave division multiplexers, optical taps, or other optical signal splitting devices.

The tower 142 is mountable to the base 114 (e.g., to the plate portion 143) in either of a first tower position and a second tower position. When the tower 142 is mounted to the base 114 in the first tower position, the tower 142 is located to facilitate routing optical fibers from the first and second gel block ports 120a, 120b to the trays 144. When the tower 142 is mounted to the base 114 in the second tower position, the tower 142 is located to facilitate routing optical fibers from the second and third gel block ports 120b, 120c to the trays 144.

The first tower position is located adjacent a different set of gel block ports 120 than the second tower position. In certain examples, the tower 142 faces in a different direction when in the first tower position compared to when in the second tower position. In certain examples, the first and second tower positions are offset about 90 degrees with respect to one another about the central longitudinal axis C of the housing 101 (e.g., compare FIGS. 9 and 10). In certain examples, the first tower position does not substantially overlap with the second tower position.

In certain implementations, the upright portion 150 of the tower 142 is positioned asymmetric relative to the base 114 in any of the tower positions. In certain examples, the upright portion 150 is positioned adjacent to a periphery of the base 114 when the tower 142 is mounted to the base 114 in any of the first and second tower positions. In certain examples, the upright portion 150 of the tower 142 is disposed adjacent the fourth side 112 of the base 114 when in the first tower position (see FIG. 9) and is disposed adjacent the first side 106 of the base 114 when in the second tower position (see FIG. 10).

In some implementations, the tower 142 is mounted to the base 114 using one or more fasteners (e.g., screws, bolts, etc.). In other implementations, the tower 142 is mounted to the base 114 using latches. In still other implementations, the tower 142 can be friction-fit to the base 114. In some implementations, the first and second tower positions are indicated on the base 114. For example, the base 114 may include fastener openings, latches, catch members, guide openings, pegs, or other mounting structures at both of the pre-defined tower positions to facilitate mounting the tower 142 to the base 114. In other implementations, however, the base 114 does not indicate the first and second tower positions.

Figure 8:
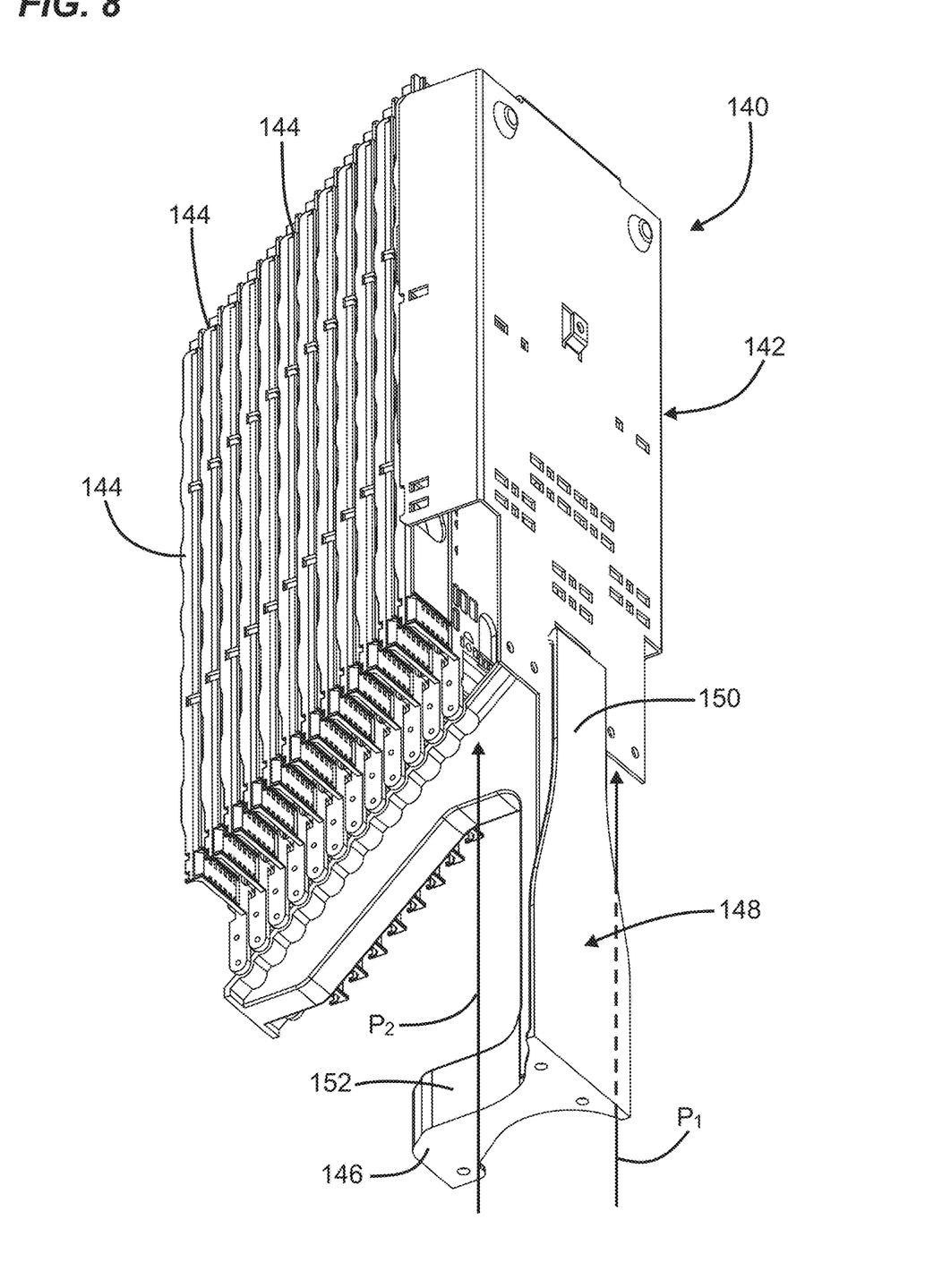
FIG. 8 is a bottom perspective view of an example fiber optic organizer suitable for use with the enclosure of FIG. 1.
Figure 9:
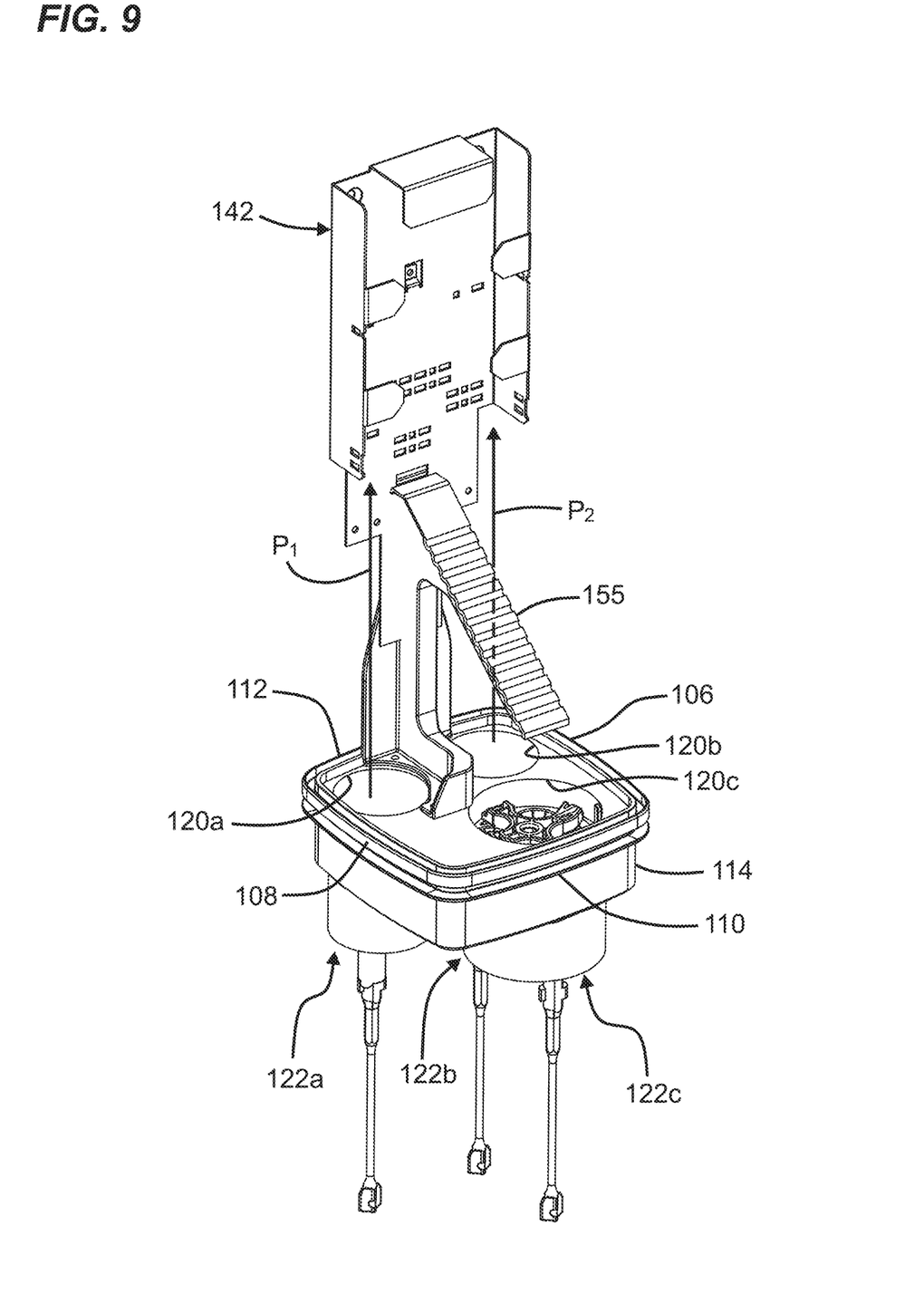
FIG. 9 shows a tower of the fiber optic organizer of FIG. 8 disposed in a first tower position relative to the base.
Figure 10:
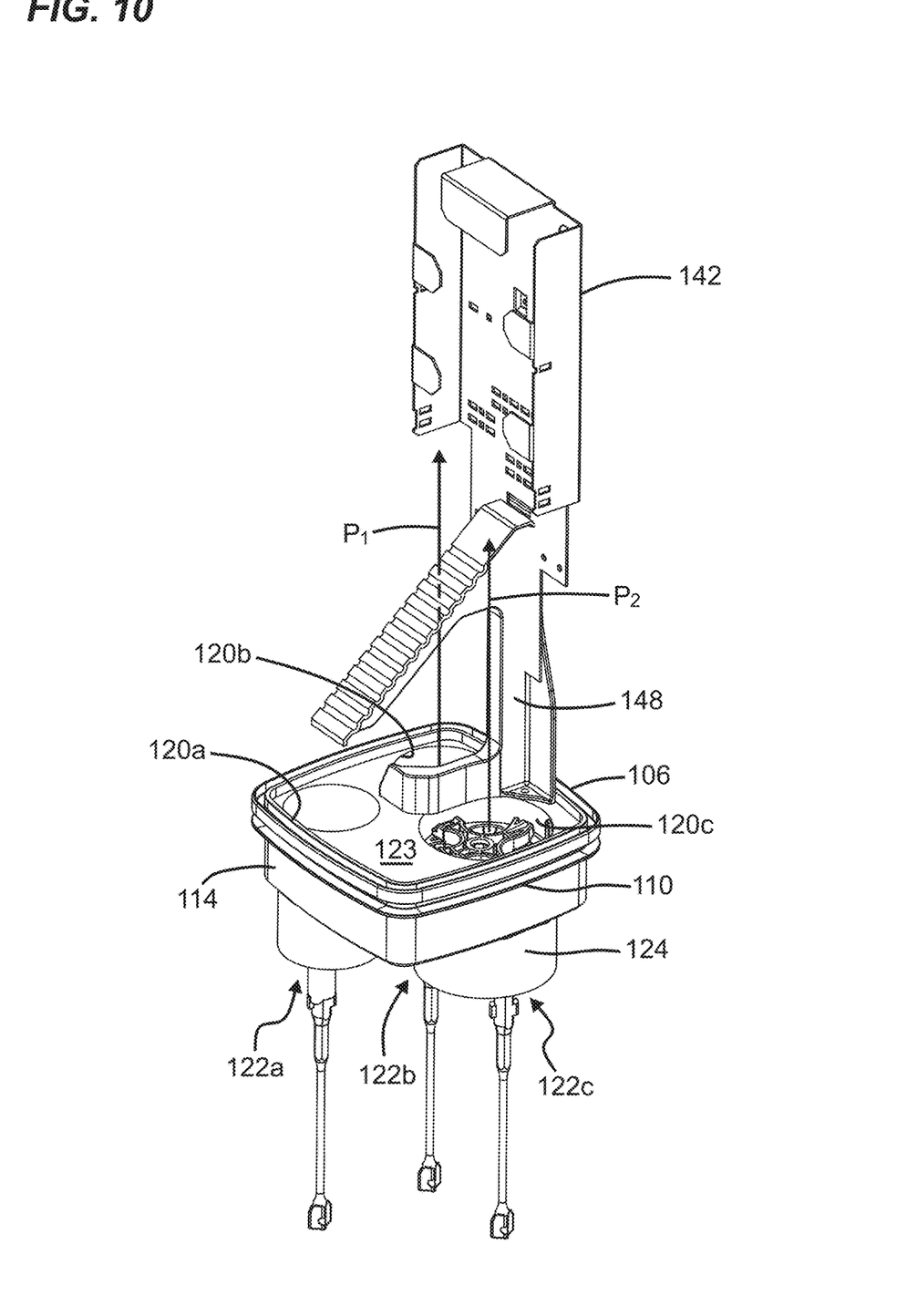
FIG. 10 shows the tower of the fiber optic organizer of FIG. 8 disposed in a second tower position relative to the base.

In certain implementations, the tower 142 includes first and second fiber routing paths P1, P2 for routing fibers from an attachment end 146 of the tower 142 toward the trays 144 (e.g., see FIG. 8). The first routing path P1 is positioned adjacent to the first gel block port 120a and the second fiber routing path P2 is positioned adjacent to the second gel block port 120b when the tower 142 is mounted to the base 114 in the first tower position (e.g., see FIG. 9). The first routing path P1 is positioned adjacent to the second gel block port 120b and the second fiber routing path P2 is positioned adjacent to the third gel block port 120c when the tower 142 is mounted to the base 114 in the second tower position.

In certain implementations, the tower 142 includes a divider 148 for separating the first and second fiber routing paths P1, P2. The divider 148 is oriented between the first and second gel block ports 120a, 120b when the tower 142 is mounted to the base 114 in the first tower position. The divider 148 is oriented between the second and third gel block ports 120b, 120c when the tower 142 is mounted to the base 114 in the second tower position.

In certain examples, the divider 148 includes a first divider portion 154 (FIG. 3) on the upright portion 150 of the tower 142 and a second divider portion 156 (FIG. 3) on the lateral extension portion 152 of the tower 142. In certain examples, the lateral extension portion 152 of the tower 142 and the second divider portion 156 of the divider 148 extend between the first and second gel block ports 120a, 120b when the tower 142 is mounted to the base 114 in the first tower position. The lateral extension portion 152 of the tower 142 and the second divider portion 156 of the divider 148 extend between the second and third gel block ports 120b, 120c when the tower 142 is mounted to the base 114 in the second tower position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A telecommunication enclosure comprising:
  a housing including:
    a dome having an open end positioned opposite from a closed end;
    a base that mounts at the open end of the dome for closing the open end of the dome, the base including first, second, and third ports adapted to receive cables or portions of cables routed into the housing, at least the second and third ports having different transverse cross-sectional areas; and
  a fiber optic organizer that mounts within the housing, the fiber optic organizer including a tower and a plurality of fiber management trays that are supported by the tower and that are pivotally movable relative to the tower, the tower being mountable to the base in first and second tower positions, wherein when the tower is mounted to the base in the first tower position, the tower is located to facilitate routing optical fibers from the first and second ports to the plurality of fiber management trays, and wherein when the tower is mounted to the base in the second tower position, the tower is located to facilitate routing optical fibers from the second and third ports to the plurality of fiber management trays.

2. The telecommunication enclosure of claim 1, wherein the first and second tower positions are offset 90 degrees with respect to one another about a central longitudinal axis of the housing.

3. The telecommunication enclosure of claim 1, wherein the tower includes first and second fiber routing paths for routing fibers from an attachment end of the tower toward the plurality of fiber management trays, wherein the first fiber routing path is positioned adjacent to the first port and the second fiber routing path is positioned adjacent to the second port when the tower is mounted to the base in the first tower position, and wherein the first fiber routing path is positioned adjacent to the second port and the second fiber routing path is positioned adjacent to the third port when the tower is mounted to the base in the second tower position.

4. The telecommunication enclosure of claim 3, wherein the tower includes a divider for separating the first and second fiber routing paths, wherein the divider is oriented between the first and second ports when the tower is mounted to the base in the first tower position, and wherein the divider is oriented between the second and third ports when the tower is mounted to the base in the second tower position.

5. The telecommunication enclosure of claim 4, wherein the tower includes an upright portion that extends from the attachment end toward the plurality of fiber management trays and a lateral extension portion at the attachment end, wherein the lateral extension portion projects laterally outwardly from the upright portion, and wherein the divider includes a first divider portion on the upright portion of the tower and a second divider portion on the lateral extension portion of the tower.

6. The telecommunications enclosure of claim 5, wherein the lateral extension portion of the tower and the second divider portion of the divider extend between the first and second ports when the tower is mounted to the base in the first tower position, and wherein the lateral extension portion of the tower and the second divider portion of the divider extend between the second and third ports when the tower is mounted to the base in the second tower position.

7. The telecommunications enclosure of claim 5, wherein the upright portion of the tower is positioned adjacent to a periphery of the base when mounted to the base in the first and second tower positions.

8. The telecommunications enclosure of claim 3, wherein the attachment end is secured to the base by fasteners.

9. The telecommunications enclosure of claim 1, wherein a cross-sectional area of the third port is at least 25 percent larger than a cross-sectional area of the second port.

10. The telecommunications enclosure of claim 1, wherein a transverse cross-sectional area of the third port is at least 50 percent larger than a transverse cross-sectional area of the second port.

11. The telecommunications enclosure of claim 1, wherein the first and second ports have equal transverse cross-sectional areas.

12. The telecommunications enclosure of claim 1, wherein the first, second and third ports each have a circular transverse cross-sectional shape.

13. The telecommunications enclosure of claim 1, wherein the base is divided into first, second, third, and fourth quadrants by first and second perpendicular reference planes that intersect at a central longitudinal axis of the housing, wherein the first, second, third, and fourth quadrants are sequentially positioned in a clockwise or counter-clockwise direction about the central longitudinal axis of the housing, wherein the first port is located at least primarily in the first quadrant, wherein the second port is located at least primarily in the second quadrant, and the third port is located at least primarily in the third quadrant.

14. The telecommunications enclosure of claim 13, wherein the fourth quadrant is primarily void of ports.

15. The telecommunications enclosure of claim 1, wherein the dome and the base have transverse cross-sectional shapes that are generally rectangular.

16. The telecommunications enclosure of claim 15, wherein the transverse cross-sectional shapes of the dome and the base are generally square.

17. The telecommunications enclosure of claim 1, wherein the dome and the base join together at a mating interface, and wherein a gasket provides sealing at the mating interface.

18. The telecommunications enclosure of claim 1, wherein the dome and the base are secured together by latches.

19. The telecommunications enclosure of claim 1, wherein the base is a molded piece, and wherein when the base is molded, the base includes unitary cover portions that close the first, second, and third ports, the unitary covers being individually removable from the first, second, and third ports to allow for installation of cable sealing gel blocks in the first, second, and third ports.

20. The telecommunications enclosure of claim 19, wherein the unitary cover portions are punch out covers or are removed by cutting.

21. The telecommunications enclosure of claim 1, wherein the base includes a main base unit that is unitarily molded as one piece, the main base unit including a plate portion, a dome mating portion that extends about a periphery of the plate portion, and first, second, and third sleeves that project axially from the plate portion and that respectively define the first, second, and third ports.

22. The telecommunications enclosure of claim 1, wherein cable sealing gel blocks each include first and second gel pressurization structures defining cable pass-through locations, a volume of gel positioned axially between the first and second gel pressurization structures, and an actuator for forcing the first and second gel pressurization structures axially toward one another to pressurize the volume of gel, wherein when the volume of gel of one of the cable sealing gel blocks is pressurized while the cable sealing gel block is installed in one of the first, second, or third ports, a circumferential exterior of the volume of gel provides circumferential sealing with respect to a portion of the base defining the port and the volume of gel also conforms around and seals around the cables routed through the cable sealing gel blocks.

23. The telecommunications enclosure of claim 1, wherein the first port is adapted to receive a first cable sealing gel block, wherein the second port is adapted to receive a second cable sealing gel block, wherein the third port is adapted to receive a third cable sealing gel block, wherein the third cable sealing gel block has a larger transverse cross-sectional area as compared to the first cable sealing gel block, and wherein the third cable sealing gel block is adapted to receive and seal larger diameter cables as compared to the first cable sealing gel block.

24. The telecommunication enclosure of claim 1, wherein the first, second and third ports are adapted to receive cable-sealing gel blocks.

* * * * *